United States Patent [19]

Bottrell

[11] 4,219,308
[45] Aug. 26, 1980

[54] TORQUE CONTROL SYSTEM FOR WIND ENERGY CONVERSION DEVICES

[75] Inventor: Gerald W. Bottrell, La Crescenta, Calif.

[73] Assignee: Ventus Energy Corp., Covina, Calif.

[21] Appl. No.: 853,395

[22] Filed: Nov. 21, 1977

[51] Int. Cl.² .............................................. F03D 7/04
[52] U.S. Cl. ..................................... 416/43; 416/151; 416/DIG. 4
[58] Field of Search .............. 416/43, 37, 41, DIG. 4, 416/104, 135 A, 9, 12, 13, 15, 151

[56] References Cited

U.S. PATENT DOCUMENTS

| 1,255,998 | 2/1918  | Fahle ........................... 416/DIG. 4 |
| 1,672,152 | 6/1928  | Constantin ........................... 416/37 |
| 1,767,303 | 6/1930  | Miller ................................... 416/13 |
| 2,179,885 | 11/1939 | Fumagalli ......................... 416/41 X |
| 2,358,781 | 9/1944  | Albers ............................... 416/41 X |
| 2,832,895 | 4/1958  | Hütter .............................. 416/41 X |

FOREIGN PATENT DOCUMENTS

| 219525  | 2/1962  | Austria ............................. 416/DIG. 4 |
| 69050   | 4/1949  | Denmark .................................. 416/41 |
| 837230  | 4/1952  | Fed. Rep. of Germany .......... 416/136 |
| 951709  | 10/1956 | Fed. Rep. of Germany .......... 416/202 |
| 1008218 | 5/1957  | Fed. Rep. of Germany ............ 416/41 |
| 878481  | 1/1943  | France ............................... 416/121 A |
| 937903  | 8/1948  | France ..................................... 416/9 |
| 964695  | 2/1950  | France ................................. 416/151 |
| 602706  | 6/1948  | United Kingdom ..................... 416/43 |
| 144495  | 3/1962  | U.S.S.R. ................................. 416/43 |

Primary Examiner—Everette A. Powell, Jr.
Attorney, Agent, or Firm—Forrest E. Logan

[57] ABSTRACT

Automatic torque control of wind energy conversion devices is provided through the utilization of turbine reaction torque. In the preferred embodiment, the frame of the driven machine is arranged to be rotatable through a limited angle. As rated torque of the system is exceeded, a force proportional to the turbine reaction torque is exerted by said frame to adjust the turbine aerodynamic configuration in such a manner as to reduce the torque error to substantially zero.

3 Claims, 3 Drawing Figures

TORQUE CONTROL SYSTEM FOR WIND ENERGY CONVERSION DEVICES

As the world's supply of fossil fuels is further depleted, the need to harness the energy in the wind assumes ever increasing importance. Unfortunately, wide use of this clean, inexhaustable source of energy has not occurred because of the high cost of wind energy conversion devices.

In order to hold size and cost of wind turbines, towers, and machinery within bounds, almost all wind energy conversion systems utilize a means to limit the effect of high winds on the device. The American farm windmill has a tail vane which, when triggered by wind speeds exceeding its set point, turns 90 degrees to the turbine shaft in order to rotate the turbine out of the wind. The 4-arm Dutch windmill relies on manual furling of canvas sails to accomplish the same effect. These devices are simple and inexpensive, but all the energy in the high winds is wasted.

In the more sophisticated designs, various methods are used to regulate the output of the system to a fairly constant level for all wind speeds above a predetermined value, called "rated wind speed". This method allows economical design of the wind turbine, tower, and machinery while recovering a large portion of the energy available in the high speed winds.

Many systems have been developed to perform this important function. Unfortunately, those that perform well are very complex and expensive while the low-cost units are generally applicable only to very small wind energy conversion devices.

The principal object of the present invention is to provide a power regulating means which is highly effective while being simple, reliable, and very low cost.

Other objectives include the provision of a power regulating means which will accomplish the following:
1. When applied to a wind turbine generator, allow generation directly into electrical power lines without the need for batteries, chargers, inverters, or other power conditioning equipment.
2. When applied to fixed pitch multi-blade wind turbines, allow effective yaw angle control for a wide range of wind speeds above rated value.
3. Perform the dual function of sensing positive and negative torque magnitudes while providing the force to initiate correction of abnormal torques.

This invention takes advantage of the principal that every action produces an equal and opposite reaction. For rotating machinery, this principal can be restated that every torque produces an equal and opposite reaction torque.

In the present invention, a wind turbine produces a torque due to action of the wind, and this torque is applied to the driven machine, usually through suitable speed increasing means. The reaction torque developed by the turbine acting on the load device is utilized to sense the torque magnitude and to provide the power to position a means to control turbine efficiency. A wide variety of such efficiency control means are in use, including the following:
1. Blade pitch control, in which the pitch of the wind turbine blades is varied from their optimum value to reduce efficiency.
2. Blade coning control, in which wind turbine blades are folded in a plane parallel to the turbine shaft, thus reducing the area swept by the wind and causing a reduction in efficiency.
3. Yaw angle control, in which the wind turbine shaft is caused to turn at a horizontal angle to the wind direction, thus causing a reduction in turbine efficiency.
4. Vertical angle control, in which the wind turbine shaft is caused to tilt at a vertical angle to the wind direction, thus causing a reduction in turbine efficiency.

The reaction torque may be utilized in at least two manners:
1. A differential machanism is inserted between the turbine and the driven load. The reaction torque is then available at the third shaft of the differential mechanism.
2. The frame of the driven equipment may be mounted in such a manner that it is free to rotate through a limited angle. The reaction torque is then exerted by the rotatable frame of the driven machine.

The numerical value of the reaction torque may be equal to that of the wind turbine, the driven equipment, or, if speed increasing or reducing means are employed, equal to meither but directly proportional to both.

Figure 1:
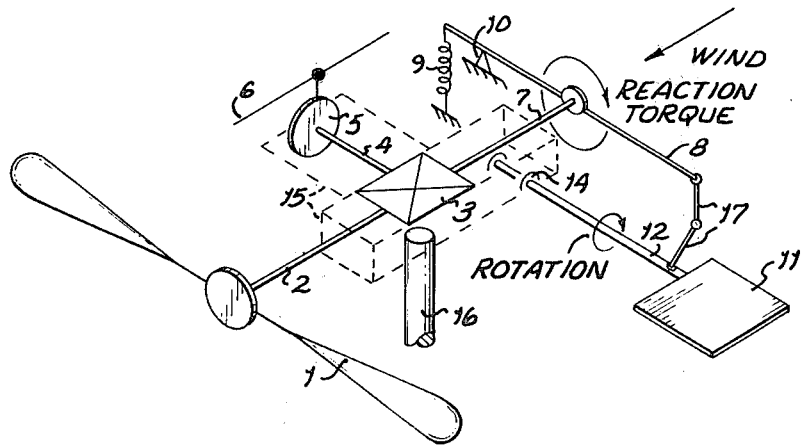
FIG. 1 is a schematic view showing one form of the invention utilizing yaw angle control positioned by means of a differential gear assembly.

FIG. 1 depicts a wind turbine 1 coupled to the input shaft 2 of a differential gear assembly 3. The output shaft 4 drives the driven equipment 5, here represented by an AC generator feeding directly into the power line 6. A third shaft 7 of the differential gear assembly is coupled to a torque arm 8 which is preloaded by means of a spring 9 and stop 10. A yaw control vane 11 is attached to an arm 12 which is free to rotate on bearings 13 and 14, attached to a chassis 15 which carries the entire mechanism atop a support tower 16. The chassis is free to rotate on the support tower.

The torque arm 8 is coupled to the yaw control vane arm 12 by means of a suitable linkage mechanism 17.

The turbine is normally oriented downwind of the tower, so that wind forces acting on the turbine create a drag which keeps the turbine directed into the wind. The yaw control vane is normally oriented parallel to the wind so that the wind exerts a negligible force on it.

As the wind speed increases, the generator is energized and begins supplying power directly into the power line and developing a retarding torque which maintains the turbine at constant or nearly constant speed. Further increases in wind speed are acceptable until the maximum safe torque of the generator or other system components is approached. This maximum safe torque is the value to which the torque arm normally is pre-loaded.

As the developed torque exceeds the set point, the torque arm overcomes the retarding torque represented by the pre-loading spring and begins to rotate. Rotation of the torque arm is translated through proper linkage, to cause the yaw control vane and arm to rotate so as to present a greater surface area to the wind. The force of the wind acting on the yaw control vane causes the entire assembly to rotate out of the wind until the developed torque is reduced to, or slightly above, the set point value.

The differential gear assembly depicted in FIG. 1 shows three distinct shafts for connection to the turbine, generator, and torque arm. The differential assembly may be the bevel gear type, planetary gear type, or of a type employing chains and sprockets or belts and pulleys. The depicted shafts represent the three power connections normally available in such a differential device. With slow-turning wind turbines, a speed increasing means is often required, but not depicted in FIG. 1. This device would be located between the turbine and the differential gear or between the differential gear and the generator. It may be separate or integral with the differential gear assembly.

Figure 2:
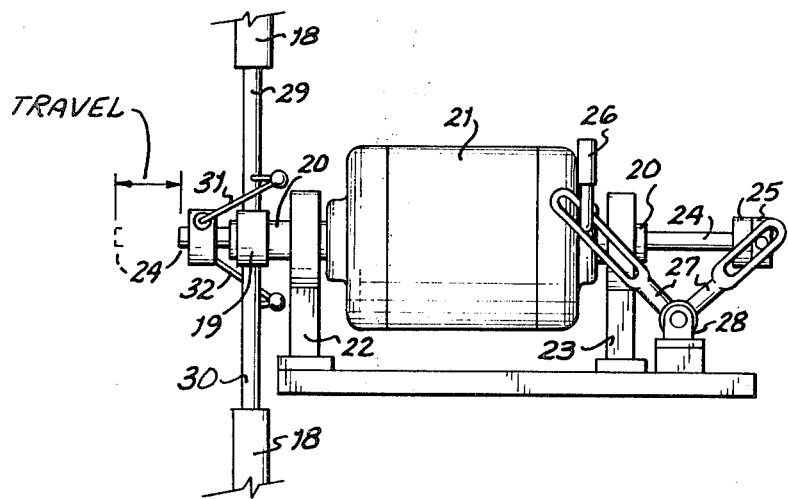
FIG. 2 illustrates the presently preferred form of the invention in which a rotatable frame of the driven equipment is utilized to position turbine blade pitch control.

FIG. 2 illustrates a physical arrangement of a wind turbine with variable pitch blades 18 supported from a central hub 19 which is direct coupled to the shaft 20 of a generator 21. The generator frame is free to rotate by means of a special mounting arrangement in which the generator front and rear shaft extensions are separately supported by pedestal bearings 22 and 23. The generator shaft is hollow to accept a control rod 24 which extends through the center of the generator shaft and protrudes at either end.

On the rear of the control rod is fitted an idler bearing 25 which allows the rod to be moved into and out of the shaft by action of a torque arm 26, fastened to the rotatable generator frame. The torque arm and idler bearing are coupled by means of a linkage mechanism 27 supported by bearings 28.

The turbine end of the control rod is fastened to rotatable blade spars 29 and 30 through linkage mechanisms 31 and 32, thus allowing the spars to be rotated and blade pitch to be altered as the axial position of the control rod is changed.

This embodiment operates to change the pitch of the turbine blades when the torque applied to the generator exceeds rated torque. The torque arm of this arrangement is normally pre-loaded by means of a spring and stop similar to those shown in FIG. 1.

FIG. 2 depicts a small wind turbine in which the speed is high enough to drive the generator directly. For larger slower-speed turbines, speed increasing devices will be inserted between the turbine and generator, in which case only the low speed turbine shaft must be hollow to accept the pitch changing control rod.

Figure 3:
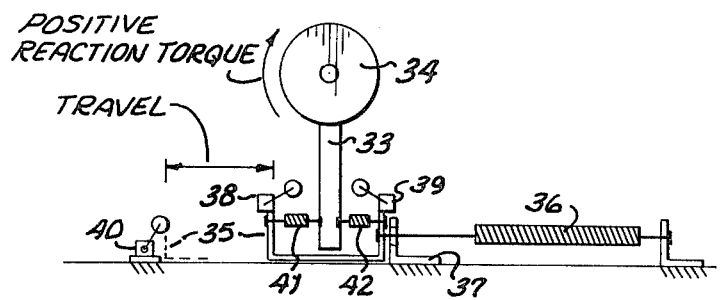
FIG. 3 is a schematic diagram of a reaction torque mechanism showing a method of pre-loading and sensing torque magnitude and direction.

FIG. 3 depicts schematically, a torque arm 33 rigidly connected to a reaction torque device 34 which may be either a rotatable frame of the driven load equipment or the third shaft of a differential gear assembly. A cradle device 35 is pre-loaded by means of a spring 36 and stop 37. Said cradle allows the torque arm some freedom to move clockwise or counterclockwise. When the force on the torque arm, acting on the cradle, exceeds that of the large spring 36, the cradle is free to move to the left, thus positioning the turbine efficiency control means as covered in FIGS. 1 and 2.

When the wind turbine produces positive torque, the control arm moves clockwise to trip switch 38. When the arm turns counterclockwise, the turbine is being driven by the load device and switch 39 is tripped. When a high torque is produced by the turbine, switch 40 is actuated by the cradle 35. Small springs 41 and 42 may be attached between the cradle and torque arm to prevent operation of switches 38 and 39 until the positive and negative torques are of the desired magnitude.

The switches depicted may be electrical, mechanical, or pneumatic. They normally are used to give indications or initiate control functions when the turbine is producing torque, absorbing torque or producing excessive torque.

I claim as my invention:
1. A wind energy conversion system comprising:
   a wind turbine for converting wind energy into a wind turbine torque, said wind turbine having variable pitch blades;
   an essentially horizontally disposed first shaft, one end of which is drivenly connected to said wind turbine;
   a driven machine having an input shaft which is drivenly connected to said first shaft and having a rotatable frame;
   a first means for rotatably supporting said driven machine in such a way that said rotatable frame is angularly displaceable about said input shaft;
   a chassis to which said first means is fixed; said rotatable frame being spaced away from said chassis by said first means so that said rotatable frame is angularly displaceable with respect to said chassis; and
   a second means drivenly connected to said rotatable frame and supported by said chassis, said second means for adjusting said variable pitch blades in such a way that, when said system is in use, wind turbine torque produces, in balance thereto, an angular displacement of said rotatable frame which in turn causes adjustment of said variable pitch blades in such a way that wind turbine torque is controlled.

2. The wind energy conversion system of claim 1 wherein said driven machine is an alternating current electric generator.

3. The wind energy conversion system of claim 2 further comprising a front and a rear shaft extension fixed to said input shaft and supported by said first means; and said first means comprising bearings which are isolated from said rotatable frame.

* * * * *